US007957876B2

(12) United States Patent
Shiiba et al.

(10) Patent No.: US 7,957,876 B2
(45) Date of Patent: Jun. 7, 2011

(54) DECELERATION CONTROL APPARATUS AND METHOD FOR VEHICLE

(75) Inventors: Kazuyuki Shiiba, Toyota (JP); Kunihiro Iwatuki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 335 days.

(21) Appl. No.: 12/089,208

(22) PCT Filed: Oct. 4, 2006

(86) PCT No.: PCT/IB2006/002759
§ 371 (c)(1),
(2), (4) Date: May 1, 2008

(87) PCT Pub. No.: WO2007/039810
PCT Pub. Date: Apr. 12, 2007

(65) Prior Publication Data
US 2008/0269998 A1    Oct. 30, 2008

(30) Foreign Application Priority Data
Oct. 5, 2005    (JP) .................................. 2005-292729

(51) Int. Cl.
*B60T 8/32*    (2006.01)
(52) U.S. Cl. ................ 701/70; 701/51; 701/57; 701/58; 701/59; 701/60; 701/61; 701/79; 706/15
(58) Field of Classification Search ................ 701/1, 29, 701/33, 35, 36, 45, 49, 48, 70, 71, 74, 78, 701/79, 83, 93, 96, 97; 340/901, 903, 435, 340/438–441, 459; 73/118.01, 121, 126, 73/489–493; 180/167–170
See application file for complete search history.

(56) References Cited

U.S. PATENT DOCUMENTS

| 4,621,705 | A | * | 11/1986 | Etoh | 180/169 |
| 4,627,011 | A | * | 12/1986 | Spencer et al. | 701/70 |
| 5,215,159 | A | * | 6/1993 | Nishida | 180/179 |
| 5,234,071 | A | * | 8/1993 | Kajiwara | 180/169 |
| 5,357,798 | A | * | 10/1994 | Weinzerl et al. | 73/146 |
| 5,408,411 | A | * | 4/1995 | Nakamura et al. | 701/48 |
| 5,419,621 | A | * | 5/1995 | Horst | 303/15 |
| 5,731,977 | A | * | 3/1998 | Taniguchi et al. | 701/96 |
| 5,752,214 | A | * | 5/1998 | Minowa et al. | 701/111 |
| 5,895,435 | A | * | 4/1999 | Ohta et al. | 701/59 |

(Continued)

FOREIGN PATENT DOCUMENTS
DE    44 37 678    5/1996
(Continued)

*Primary Examiner* — Jack Keith
*Assistant Examiner* — Jonathan M Dager
(74) *Attorney, Agent, or Firm* — Oblon, Spivak, McClelland, Maier & Neustadt, L.L.P.

(57) ABSTRACT

A deceleration control apparatus and method for a vehicle applies a deceleration, which is equal to or smaller than a guard value, to the vehicle based on a vehicle running environment parameter. The deceleration control apparatus determines the manner in which a driver performs an operation for decelerating the vehicle, and changes the guard value based on the manner in which the driver performs the operation for decelerating the vehicle. The manner in which the driver performs the operation for decelerating the vehicle may be determined based on at least one of the time at which the driver performs the operation for decelerating the vehicle, the time period during which the driver operates the brake, and the deceleration achieved by the brake operation.

16 Claims, 6 Drawing Sheets

U.S. PATENT DOCUMENTS

| | | | |
|---|---|---|---|
| 5,919,244 A * | 7/1999 | Danz et al. | 701/57 |
| 5,983,154 A * | 11/1999 | Morisawa | 701/56 |
| 6,070,118 A * | 5/2000 | Ohta et al. | 701/65 |
| 6,135,578 A * | 10/2000 | Clar et al. | 303/114.3 |
| 6,223,118 B1 | 4/2001 | Kobayashi et al. | |
| 6,278,928 B1 | 8/2001 | Aruga et al. | |
| 6,397,140 B2 * | 5/2002 | Minowa et al. | 701/96 |
| 6,459,980 B1 * | 10/2002 | Tabata et al. | 701/70 |
| 6,618,664 B2 * | 9/2003 | Matsumoto et al. | 701/96 |
| 6,721,659 B2 * | 4/2004 | Stopczynski | 701/301 |
| 6,792,344 B2 * | 9/2004 | Minowa et al. | 701/96 |
| 6,894,605 B2 * | 5/2005 | Isogai et al. | 340/435 |
| 6,906,639 B2 * | 6/2005 | Lemelson et al. | 340/903 |
| 6,920,384 B2 * | 7/2005 | Shiimado et al. | 701/65 |
| 7,433,774 B2 * | 10/2008 | Sen et al. | 701/102 |
| 7,472,006 B2 * | 12/2008 | Turski et al. | 701/41 |
| 7,505,842 B2 * | 3/2009 | Luh | 701/55 |
| 7,540,344 B2 * | 6/2009 | Yamamoto et al. | 180/65.285 |
| 2001/0008989 A1 * | 7/2001 | Minowa et al. | 701/96 |
| 2001/0016795 A1 * | 8/2001 | Bellinger | 701/53 |
| 2003/0065432 A1 * | 4/2003 | Shuman et al. | 701/48 |
| 2003/0080614 A1 * | 5/2003 | Soga | 303/152 |
| 2003/0130780 A1 * | 7/2003 | Shiimado et al. | 701/65 |
| 2004/0153233 A1 * | 8/2004 | Minowa et al. | 701/96 |
| 2004/0162187 A1 * | 8/2004 | Suzuki | 477/182 |
| 2004/0243292 A1 * | 12/2004 | Roy | 701/36 |
| 2004/0249533 A1 * | 12/2004 | Wheals et al. | 701/36 |
| 2005/0030184 A1 * | 2/2005 | Victor | 340/576 |
| 2005/0125134 A1 * | 6/2005 | Iwatsuki et al. | 701/70 |
| 2005/0125137 A1 * | 6/2005 | Shiiba et al. | 701/96 |
| 2005/0131597 A1 * | 6/2005 | Raz et al. | 701/29 |
| 2005/0168328 A1 * | 8/2005 | Kitterer et al. | 340/435 |
| 2005/0187694 A1 | 8/2005 | Shiiba et al. | |
| 2005/0216162 A1 * | 9/2005 | Suzuki et al. | 701/70 |
| 2005/0234626 A1 * | 10/2005 | Shiiba et al. | 701/70 |
| 2005/0236895 A1 * | 10/2005 | Matsumoto et al. | 303/140 |
| 2006/0041366 A1 * | 2/2006 | Kato et al. | 701/72 |
| 2006/0060399 A1 * | 3/2006 | Tabata et al. | 180/65.2 |
| 2006/0064225 A1 * | 3/2006 | Tabata et al. | 701/96 |
| 2006/0066146 A1 * | 3/2006 | Otomo | 303/151 |
| 2006/0109094 A1 * | 5/2006 | Prakah-Asante et al. | 340/435 |
| 2006/0190158 A1 * | 8/2006 | Shiiba et al. | 701/70 |
| 2006/0224284 A1 * | 10/2006 | Ueno et al. | 701/36 |
| 2007/0299612 A1 * | 12/2007 | Kimura et al. | 701/301 |
| 2009/0012684 A1 * | 1/2009 | Thiele | 701/70 |

FOREIGN PATENT DOCUMENTS

| | | |
|---|---|---|
| EP | 0 838 363 A2 | 4/1998 |
| EP | 1 170 652 | 1/2002 |
| EP | 1 352 773 | 10/2003 |
| JP | 9 280353 | 10/1997 |
| JP | 10-109565 | 4/1998 |
| JP | 11-222055 | 8/1999 |
| JP | 11-348746 | 12/1999 |
| JP | 2001 145937 | 5/2000 |
| JP | 2001-206097 | 7/2001 |
| JP | 2002-59820 | 2/2002 |
| JP | 2005-126060 | 5/2005 |
| JP | 2005 147309 | 6/2005 |

* cited by examiner

FIG. 5

|  |  | CAR-TO-CAR DISTANCE [sec] | | | |
|---|---|---|---|---|---|
|  |  | 0~1.0 | 1.0~2.0 | 2.0~3.0 | 3.0~ |
| RELATIVE VEHICLE SPEED [km/h] | 0~10 | 6th | 6th | 6th | 6th |
|  | 10~20 | 4th | 5th | 5th | 6th |
|  | 20~30 | 3rd | 4th | 4th | 6th |
|  | 30~40 | 3rd | 3rd | 4th | 6th |
|  | 40~ | 2nd | 3rd | 3rd | 5th |

DECELERATION CONTROL APPARATUS AND METHOD FOR VEHICLE

CROSS-REFERENCE TO RELATED APPLICATIONS

The present application claims priority to Japanese Patent Application No. 2005-292729 filed on Oct. 5, 2005, the entire contents of which including the specification, drawings and abstract are incorporated herein by reference.

BACKGROUND OF THE INVENTION

1. Field of the Invention

The invention relates generally to a deceleration control apparatus for a vehicle. More specifically, the invention relates to a deceleration control apparatus and method for a vehicle that applies a deceleration, which is equal to or smaller than a guard value, to the vehicle based on a vehicle running environment parameter (e.g. whether there is a curve in a road ahead of the vehicle, and a distance from a preceding vehicle).

2. Description of the Related Art

Performing deceleration control on a vehicle (for example, by applying an automatic brake or shifting to a lower gear of a transmission) based on a vehicle running environment parameter (for example, whether there is a curve in a road ahead of the vehicle, and a distance from a preceding vehicle) is known. Such a technology is described, for example, in Japanese Patent Application Publication No. JP-A-2000-145937. According to this publication, an appropriate speed for a vehicle to go round a curve in a road ahead of the vehicle is calculated before the vehicle enters the curve, based on road information that has been read from a navigation-processing unit. Based on the calculated appropriate speed, and the position and the speed of the vehicle, the necessity of deceleration is determined in advance. When it is determined that deceleration is necessary, shift control to select a predetermined gear is executed in response to a deceleration operation by the driver, such as release of an accelerator pedal or application of a brake pedal, and the gear is shifted down, for example, from fourth gear to third gear, or from third gear to second gear. Thus, a downshift is performed at a time at which the vehicle is at an appropriate position, and which accommodates the deceleration intention of the driver.

Applying a deceleration, which is equal to or smaller than a guard value (i.e., the maximum value of deceleration that a deceleration control apparatus for a vehicle can set), to a vehicle based on a vehicle running environment parameter is known. Setting a larger guard value makes it possible to apply a larger deceleration to the vehicle. In this case, the deceleration control produces sufficient effects. Meanwhile, the driver tends to depend on the control, resulting in negligent operation of the vehicle. In order to avoid this, the guard value needs to be set to such a value at which the driver feels the sufficient effect of the control but does not depend on the control. However, such a value varies depending on the driving style (or preference) of the driver. Accordingly, it is difficult to set a guard value applicable to every driver. Therefore, the guard value has been set to a sufficiently small value at which almost all the drivers do not depend on the control.

DESCRIPTION OF THE INVENTION

The invention is made in light of the foregoing circumstances. The invention provides a deceleration control apparatus and method for a vehicle which applies a deceleration, equal to or smaller than a guard value, to the vehicle, and which is capable of setting the guard value to a more appropriate value.

An aspect of the invention relates to a deceleration control apparatus for a vehicle that applies a deceleration, which is equal to or smaller than a guard value, to the vehicle based on a vehicle running environment parameter. The deceleration control apparatus includes a determining device that determines the manner in which a driver performs an operation for decelerating the vehicle; a setting device that sets a deceleration that is smaller than a deceleration achieved by a brake operation performed by a driver as a guard value to be applied to the vehicle by the deceleration control apparatus; and a changing device that changes the deceleration that is set as a guard value based on the manner in which the driver performs the operation for decelerating the vehicle.

Another aspect of the invention relates to a deceleration control method for a vehicle that applies a deceleration, which is equal to or smaller than a guard value, to the vehicle based on a vehicle running environment parameter. In the deceleration control method, the manner in which a driver performs the operation for decelerating the vehicle is determined; and the guard value is changed based on the manner in which the driver performs the operation for decelerating the vehicle.

In the deceleration control apparatus and the deceleration control method of the invention, the manner in which the driver performs the operation for decelerating the vehicle may be determined based on at least one of the time at which the driver performs the operation for decelerating the vehicle, information based on an operation of a brake, and the deceleration achieved by the operation of the brake.

In the deceleration control apparatus and the deceleration control method of the invention, when at least one of a determination that the time at which the driver performs the operation for decelerating the vehicle is relatively late; a determination that the time period during which the brake is operated is relatively short, and a determination that the deceleration achieved by the operation of the brake is relatively large is made, the guard value may be changed to a value larger than the guard value that is used when none of the determinations are made.

In the deceleration control apparatus and the deceleration control method of the invention, when at least one of a determination that the time at which the driver performs the operation for decelerating the vehicle is relatively early, a determination that the time period during which the brake is operated is relatively long, and a determination that the deceleration achieved by the operation of the brake is relatively small is made, the guard value may be changed to a value smaller than the guard value that is used when none of the determinations are made.

In the deceleration control apparatus and method for a vehicle of the invention, the guard value may be set to a value smaller than the deceleration that is achieved by an operation performed by an average driver.

In the deceleration control apparatus and method for a vehicle of the invention, the deceleration that was achieved by the operation performed by the driver in the past may be detected, and the deceleration that is achieved by the operation performed by the average driver may be set based on the detected value.

Another aspect of the invention relates to a deceleration control apparatus for a vehicle that applies a deceleration, which is equal to or smaller than a guard value, to the vehicle based on a vehicle running environment parameter. In this deceleration control apparatus, the guard value is set to a value that is smaller than the deceleration that is achieved by an operation performed by an average driver.

Another aspect of the invention relates to a deceleration control method for a vehicle that applies a deceleration, which is or smaller than a guard value, to the vehicle based on a vehicle running environment parameter. In this deceleration control method, the guard value is set to a value that is smaller than the deceleration that is achieved by an operation performed by an average driver.

In the deceleration control apparatus and the deceleration control method of the invention, the deceleration achieved by the operation performed by the driver in the past may be detected, and the deceleration that is achieved by the operation performed by the average driver may be set based on the detected value.

The deceleration control apparatus and method for a vehicle according to the invention makes it possible to set the guard value to a more appropriate value in the deceleration control for a vehicle that applies a deceleration, which is equal to or smaller than the guard value, to the vehicle.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which:

FIG. 5 is the table showing a target shift map used by the deceleration control apparatus for a vehicle according to the first embodiment of the invention.

DETAILED DESCRIPTION OF THE EXAMPLE EMBODIMENT

In the following description and the accompanying drawings, the present invention will be described in more detail with reference to an example embodiment.

With reference to FIG. 1 to FIG. 5, the embodiment of the invention will be explained. According to the embodiment, in a deceleration control apparatus for a vehicle that applies a deceleration, which is equal to or smaller than a guard value, to the vehicle based on a vehicle running environment parameter, the manner in which a driver performs an operation for decelerating the vehicle is determined. Then, the guard value is changed based on the determined manner.

In the embodiment, means for increasing the deceleration (e.g. downshifting, applying an automatic brake, applying a regenerative brake, closing an electronically controlled throttle valve, applying an exhaust brake) and means for determining the manner in which the driver performs the operation for decelerating the vehicle are configured, as will be described later in detail. The means for increasing the deceleration increases the deceleration applied to the vehicle based on a running environment parameter (e.g. whether there is, in the road ahead of the vehicle, a curve, a preceding vehicle, an intersection, a stop sign, a tollbooth, a traffic signal, a pedestrian-crossing, or a pedestrian crossing the road; a road inclination; and visibility of the driver). The means for determining the deceleration manner determines the manner in which the driver performs the operation for decelerating the vehicle (which is the information obtained based on the brake operation, and the information includes, for example, the time period during which a footbrake is depressed and a depressing force applied onto the foot brake, the brake pressure, the stroke amount of the brake pedal, the deceleration achieved by applying the brake, the time at which an accelerator pedal is released, and the time at which the brake is operated).

Figure 2:
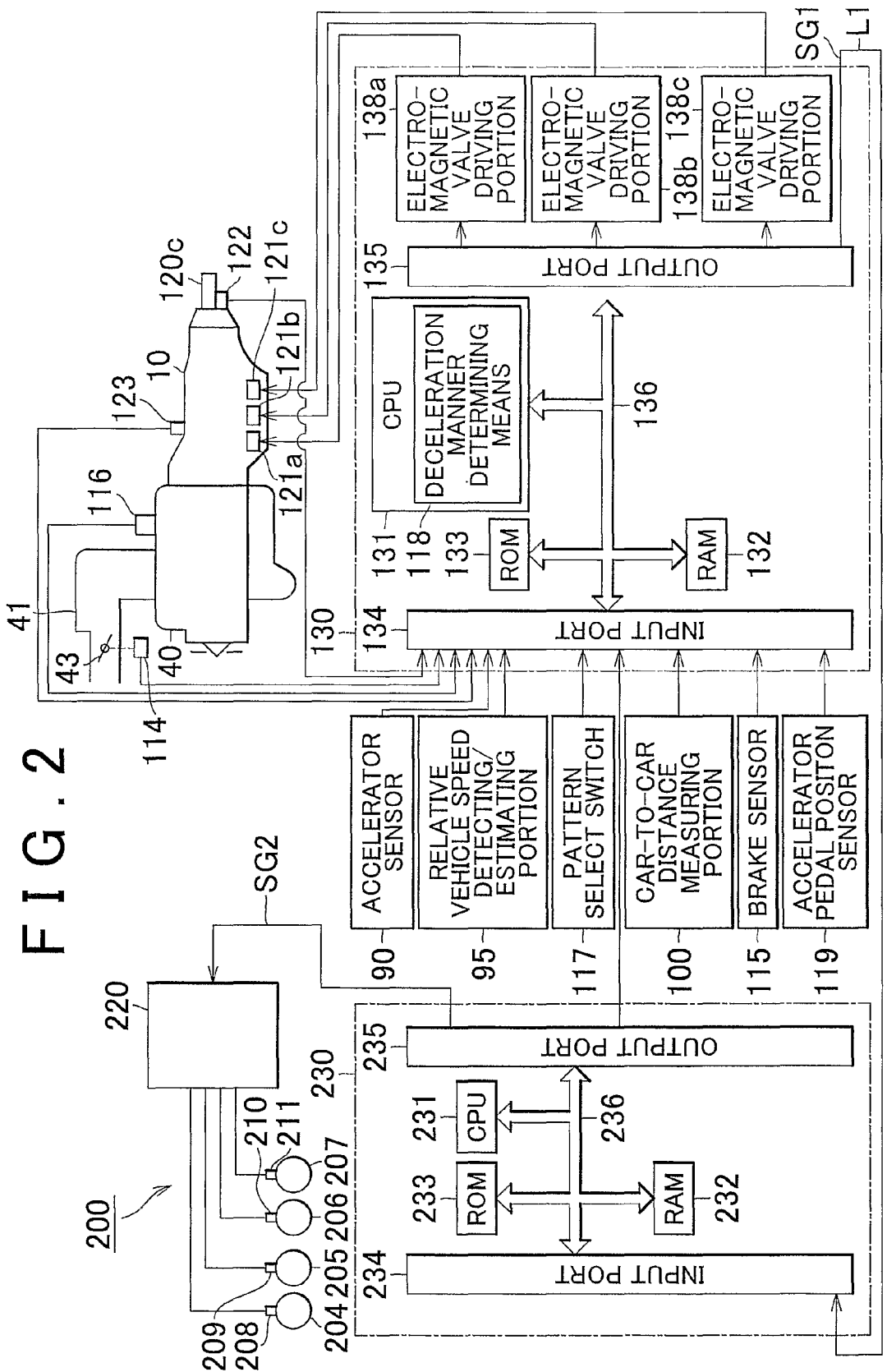
FIG. 2 is the schematic view of the deceleration control apparatus for a vehicle according to the embodiment of the invention.

FIG. 2 shows an automatic transmission 10, an engine 40, and a brake apparatus 200. The automatic transmission 10 is a five-speed transmission in which hydraulic pressure is controlled by energizing or de-energizing electromagnetic valves 121a, 121b and 121c. Although FIG. 2 shows the three electromagnetic valves 121a, 121b and 121c, the number of the electromagnetic valves is not limited to three. The electromagnetic valves 121a, 121b and 121c are driven by signals from a control circuit 130.

A throttle opening degree sensor 114 detects the opening degree of a throttle valve 43 provided in an intake passage 41 of the engine 40. An engine speed sensor 116 detects the speed of the engine 40. A vehicle speed sensor 122 detects the rotation speed of an output shaft 120c of the automatic transmission 10, which is proportional to the vehicle speed. A shift position sensor 123 detects the shift position. A pattern select switch 117 is used to instruct the shift pattern. An acceleration sensor 90 detects the deceleration applied to the vehicle. A relative vehicle speed detecting/estimating portion 95 detects or estimates the relative vehicle speed between the vehicle and a preceding vehicle. A car-to-car distance-measuring portion 100 includes a sensor, such as a millimeter-wave radar sensor or a laser radar sensor installed at the front of the vehicle, to measure the distance from a preceding vehicle. A brake sensor 115 detects information relating to a foot brake (not shown), such as the time period during which the foot brake is operated, the depressing force applied onto the brake, the deceleration achieved by the brake, and the brake hydraulic pressure. An accelerator pedal position sensor 119 detects information relating to an accelerator pedal, such as the position of the accelerator pedal, and time at which the accelerator pedal is released.

The control circuit 130 receives various signals indicative of the detection results obtained by the throttle opening degree sensor 114, the engine speed sensor 116, the vehicle speed sensor 122, the shift position sensor 123, and the acceleration sensor 90. Further, the control circuit 130 receives a signal indicative of the switching state of the pattern select switch 117, and signals indicative of the detection or estimation results obtained by the relative speed detecting/estimating portion 95, the accelerator pedal position sensor 119, and the brake sensor 115. Furthermore, the control circuit 130 receives a signal indicative of the measurement result obtained by the car-to-car distance-measuring portion 100.

The control circuit 130 is composed of a known microcomputer, and includes a CPU 131, RAM 132, ROM 133, an input port 134, an output port 135, and a common bus 136. Signals from the aforementioned sensors 114, 116, 122, 123 and 90, as well as signals from the pattern select switch 117, the relative vehicle speed detecting/estimating portion 95, the accelerator pedal position sensor 119, the brake sensor 115, and the vehicle-to-vehicle distance measuring portion 100 are all input into the input port 134. Electromagnetic valve driving portions 138a, 138b and 138c, as well as a brake braking force signal line L1 leading to a brake control circuit 230 are connected to the output port 135. The brake braking force signal line L1 transmits a brake braking force signal SG1.

A deceleration manner determining means 118 may be provided as a portion of the CPU 131. The deceleration manner determining means 118 determines the manner in which the driver performs the operation for decelerating the vehicle. More specifically, based on the operation performed by the driver (which is the information obtained based on the brake operation, and the information includes, for example, the time period during which the foot brake is operated and the depressing force applied onto the foot brake, the brake pressure, the stroke amount of the brake pedal, the deceleration achieved by the brake, the time at which accelerator pedal is released, and the time at which the brake is applied), it is determined whether the manner in which the driver performs the operation for decelerating the vehicle corresponds to a preset average driver; or a driver who releases the accelerator pedal at a late time and achieves a large deceleration by applying the foot brake in a short time period, as compared to the average driver (hereinafter, such a driver will be referred to as a "last-minute deceleration-operation driver" in this specification).

Figure 1:
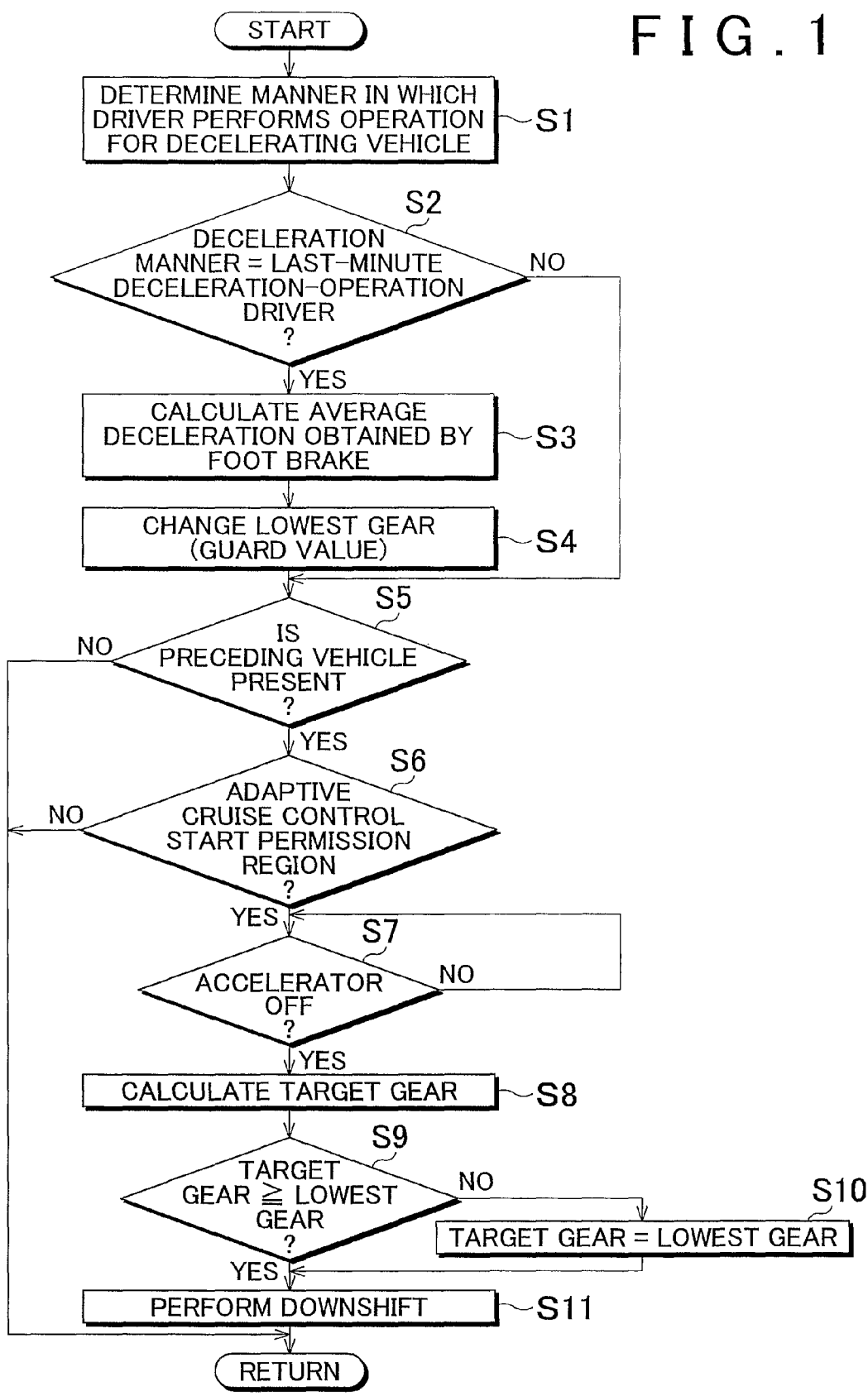
FIG. 1 is the flow chart showing the operation performed by a deceleration control apparatus for a vehicle according to an embodiment of the invention.

The ROM 133 stores programs in which the operation (i.e., control steps) shown in the flowchart of FIG. 1 has been written in advance, as well as a shift map for shifting gears of the automatic transmission 10 and the operation of the shift control (not shown). The control circuit 130 shifts gears of the automatic transmission 10 in accordance with various control conditions received.

The brake apparatus 200, which is controlled by the brake control circuit 230 that receives the braking force signal SG1 from the control circuit 130, applies a braking force to the vehicle. The brake apparatus 200 includes a hydraulic pressure control circuit 220, brake devices 208, 209, 210 and 211 that are respectively provided in wheels 204, 205, 206 and 207 of the vehicle. The brake hydraulic pressure of each of the brake devices 208, 209, 210 and 211 is controlled by the hydraulic pressure control circuit 220. By means of the brake hydraulic pressure, the brake devices 208, 209, 210 and 211 control the braking force of the wheels 204, 205, 206 and 207, respectively. The hydraulic control circuit 220 is controlled by the brake control circuit 230.

The hydraulic pressure control circuit 220 performs brake control by controlling the brake hydraulic pressure supplied to each of the brake devices 208, 209, 210 and 211 based on a brake control signal SG2. The brake control signal SG2 is generated by the brake control circuit 230 based on the brake braking force signal SG1. The brake braking force signal SG1 is output from the control circuit 130 of the automatic transmission 10, and is input into the brake control circuit 230. The braking force applied to the vehicle during the brake control is determined by the brake control signal SG2 that is generated by the brake control circuit 230 based on various data contained in the brake braking force signal SG1.

The brake control circuit 230 is composed of a known microcomputer, and includes a CPU 231, RAM 232, ROM 233, an input port 234, an output port 235, and a common bus 236. The output port 235 is connected to the hydraulic pressure control circuit 220. Stored in the ROM 233 is the operation performed when the brake control signal SG2 is generated based on the various data contained in the brake braking force signal SG1. The brake control circuit 230 performs the control (i.e., the brake control) on the brake apparatus 200 in accordance with various control conditions.

Figure 3:
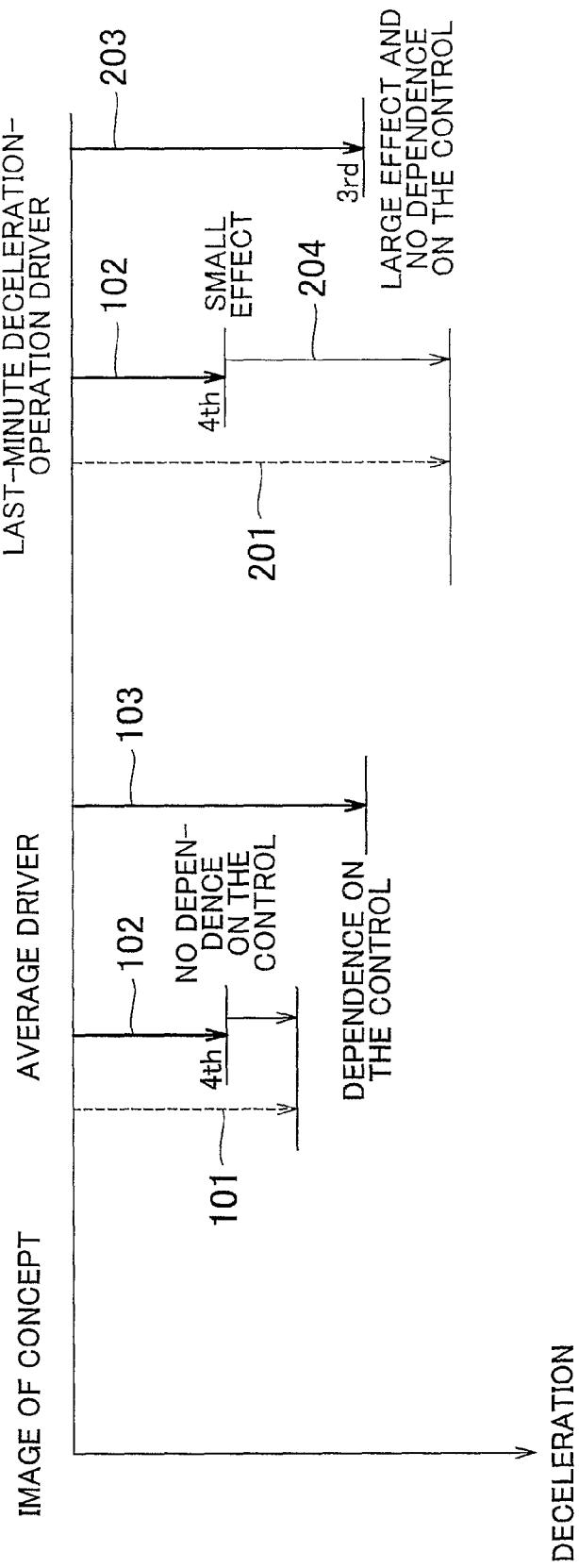
FIG. 3 is the pattern diagram for explaining a concept based on which the deceleration control apparatus for a vehicle according to the embodiment of the invention performs deceleration control.

With reference to FIG. 3, the concept of the embodiment will be described. FIG. 3 shows a plurality of drivers who decelerate the vehicle in different manners, that are, the average (common) driver who decelerates the vehicle in the preset average manner, and the last-minute deceleration-operation driver who performs the operation for decelerating the vehicle at a time that is later than that of the average driver. FIG. 3 is the image diagram that schematically shows the relationship between the decelerations usually achieved and the decelerations achieved by the control (i.e., the guard value: the maximum value of deceleration that the deceleration control apparatus for the vehicle can set), in the case of the two types of drivers described above.

In the case where the distance between the preceding vehicle and the vehicle is gradually reduced, the average driver operates the foot brake when the distance from the preceding vehicle is still relatively long, while the last-minute deceleration-operation driver does not operate the foot brake until the distance from the preceding vehicle becomes considerably short and operates the foot brake at the last minute.

A deceleration 101 is usually achieved by the brake operation performed by the average driver. A deceleration 201, on the other hand, is usually achieved by the brake operation performed by the last-minute deceleration-operation driver. The deceleration 201 is larger than the deceleration 101. The deceleration 101 and the deceleration 201 are each obtained from running test data.

In the case of the average driver, if a deceleration (guard value) 102 that is achieved by the deceleration control is smaller than the deceleration 101 usually achieved by the brake operation performed by the driver, the driver needs to perform a foot brake operation 104 to compensate for a shortfall in the deceleration. As a result, the driver does not depend on the deceleration control. On the other hand, when a deceleration (guard value) 103 achieved by the deceleration control is larger than the deceleration 101 usually achieved by the brake operation performed by the average driver, the driver does not need to operate the foot brake. As a result, the driver depends on the deceleration control. To prevent the driver from depending on the deceleration control, it is necessary to set the deceleration (guard value) that is achieved by the deceleration control to a value smaller than the deceleration usually achieved by the brake operation performed by the driver.

The deceleration 201 usually achieved by the brake operation performed by the last-minute deceleration-operation driver is large. Accordingly, if the deceleration control makes it possible to achieve only the same deceleration as the deceleration (guard value) 102 achieved by the deceleration control for the average driver, the effect of the deceleration control is not sufficient for the last-minute deceleration-operation driver. In order to compensate for the shortfall in the deceleration, the driver needs to perform a foot brake operation 204. Accordingly, in the case of the last-minute deceleration-operation driver, a deceleration (guard value) 203 achieved by the deceleration control should be set to a value that is larger than the deceleration (guard value) 102 achieved by the deceleration control for the average driver, and smaller than the deceleration 201 usually achieved by the brake operation performed by the last-minute deceleration-operation driver. Thus, sufficient effect of the deceleration control is obtained, and it is possible to prevent the driver from depending on the deceleration control. In the embodiment, the guard value of the deceleration that is achieved by the deceleration control is set based on the manner in which the driver performs the operation for decelerating the vehicle.

With reference to FIG. 1 and FIG. 2, the operation according to the embodiment will be described. In the embodiment, the case in which adaptive cruise control is carried out (in the adaptive cruise control, whether the vehicle needs to be decelerated is determined based on a positional relationship between a preceding vehicle and the vehicle, and if it is determined that the vehicle needs to be decelerated, a downshift control to a target gear is performed) will be described.

First, as shown by step S1 in FIG. 1, the deceleration manner determining means 118 of the control circuit 130 determines the manner in which the driver performs the operation for decelerating the vehicle. In the embodiment, the determination is made based on the deceleration operation performed by the driver when, for example, the vehicle caught up with a preceding vehicle in the past. More specifically, if it is determined that the estimated duration of time before a crash (car-to-car distance/relative vehicle speed) or the car-to-car time (car-to-car distance/vehicle speed) that is detected when the accelerator pedal is released or the foot brake is applied is smaller than that in the case of the preset average driver, or if it is determined that the foot brake is operated in a short time period and a large deceleration is achieved by the foot brake operation in the short time period as compared to the average driver, it is then determined that the manner in which the driver decelerates the vehicle corresponds to the last-minute deceleration-operation driver. In the above determination, the control circuit 130 uses data that have been received from the relative vehicle speed detecting/estimating portion 95, the car-to-car distance-measuring portion 100, the vehicle speed sensor 122, the brake sensor 115, and the accelerator pedal position sensor 119.

The above determination factors (i.e., the estimated duration of time before a crash (car-to-car distance/relative vehicle speed) or the car-to-car time (car-to-car distance/vehicle speed) that is detected when the accelerator pedal is released or the foot brake is applied, the time period during which the foot brake is operated, whether a large deceleration is achieved by the foot brake operation in a short time period, and the time at which the foot brake is operated) may be used, solely or in combination, to determine the manner in which the driver performs the operation for decelerating the vehicle. Alternatively, the manner in which the driver performs the operation for decelerating the vehicle may be determined based on results (including an average value) obtained by statistically processing a plurality of data on the past deceleration operations that have been stored in the ECU of the vehicle. After step S1 is completed, the operation proceeds to the step S2.

In step S2, the control circuit 130 determines, based on the result of determination made in step S1, whether the determined manner in which the driver performs the operation for decelerating the vehicle corresponds to the last-minute deceleration-operation driver. If it is determined that the determined manner in which the driver performs the operation for decelerating the vehicle corresponds to the last-minute deceleration-operation driver, the operation proceeds to step S3, otherwise to step S5.

In step S3, the control circuit 130 obtains the statistical results (including the average value) of the deceleration achieved by operating the foot brake, by statistically processing the data on the deceleration operation performed by the driver when the vehicle caught up with a preceding vehicle in the past. After step S3 is completed, the operation proceeds to the step S4.

In step S4, firstly, the control circuit 130 changes the lowest gear (guard value) that can be selected by the deceleration control (downshift control), that is, the adaptive cruise control in the embodiment. That is, the lowest gear set in step S4 is different from the lowest gear that can be selected by the downshift control when the manner in which the driver performs the operation for decelerating the vehicle corresponds to the average driver (in a normal case).

For example, when the lowest gear that can be selected by the downshift control in the normal case is set to fourth gear, in step S4, the lowest gear that can be selected by the downshift control is changed to a gear that is lower than fourth gear (for example, third gear or second gear). That is, in step S4, the lowest gear that can be selected by the down shift control is changed to a gear at which a deceleration, which is larger than the deceleration achieved at the lowest gear that can be selected by the downshift control in the normal case, is achieved.

As described with reference to FIG. 1, the deceleration usually achieved by the foot brake operation performed by the last-minute deceleration-operation driver is larger than that of the average driver. Accordingly, in the case of the last-minute deceleration-operation driver, in order to improve the effect of the deceleration control, the lowest gear (guard value) is changed to apply a larger deceleration to the vehicle. Thus, a downshift control to a lower gear can be performed.

In step S4, secondly, the control circuit 130 changes the lowest gear that can be selected by the downshift control to a gear at which a deceleration, which does not exceed the value obtained in step S3 by statistically processing the deceleration achieved by the foot brake operation, is achieved. As described with reference to FIG. 3, if the downshift control produces a deceleration larger than the deceleration usually achieved by the foot brake operation performed by the driver, the driver does not need to operate the foot brake, so that the driver depends on the control. After step S4 is completed, the step S5 is executed.

In step S5, the control circuit 130 determines whether there is a preceding vehicle at the moment. More specifically, the control circuit 130 determines whether the car-to-car distance between the vehicle and the preceding vehicle is equal to or shorter than a predetermined value, based on a signal indicative of the car-to-car distance currently received from the car-to-car distance-measuring portion 100. When it is determined in step S5 that there is a preceding vehicle, the operation proceeds to step S6. On the other hand, when is determined there is no preceding vehicle, the control flow is performed again.

In step S6, the control circuit 130 determines whether the point, which indicates the relationship between the relative vehicle speed and the car-to-car distance between the vehicle and the preceding vehicle, is currently in a control start permission region where the adaptive cruise control (downshift control) needs to be performed. It is determined whether the operation for decelerating the vehicle needs to be performed to prevent the vehicle from catching up with the preceding vehicle. When it is determined in step S6 that the point described above is in the control start permission region, the operation goes to step S7; otherwise, the control flow is performed again.

More specifically, in step S6, if the car-to-car distance is equal to or shorter than a predetermined value (for example, 50 m); if the estimated duration of time before a crash (car-to-car distance/relative vehicle speed) is equal to or shorter than a predetermined value (for example, 6 sec); or if the car-to-car time (car-to-car distance/vehicle speed) is equal to or shorter than a predetermined value (for example, 2 sec), it may be determined that the point described above is in the control start permission region.

Figure 4:
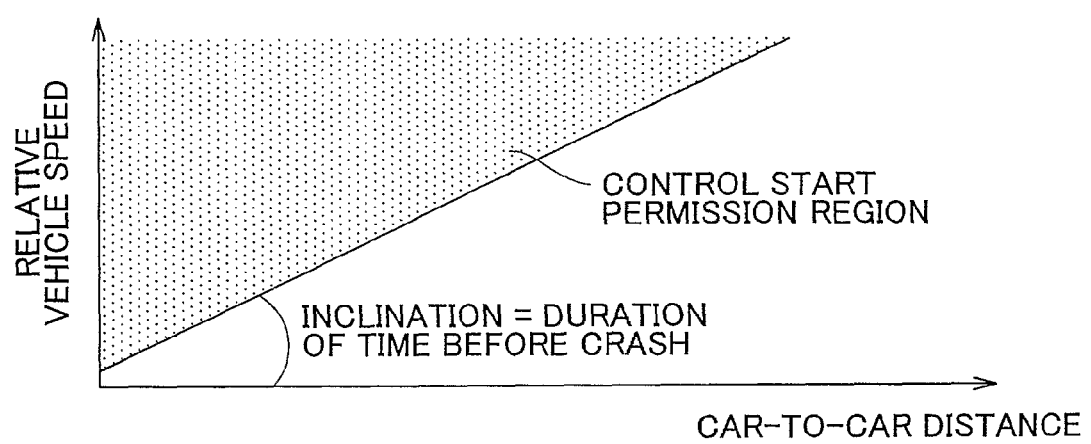
FIG. 4 is the graph for explaining a control start permission region where the deceleration control apparatus for a vehicle according to the embodiment of the invention needs to start the deceleration control.

Note that, FIG. 4 is a graph that shows one example of the control start permission region that is used to determine whether the adaptive cruise control (downshift control) needs to be performed based on the estimated duration of time before a crash. In FIG. 4, the car-to-car distance is represented by the horizontal axis and the relative vehicle speed is represented by the vertical axis, and the duration of time before a crash is indicated by the inclination defined by the car-to-car distance and the relative vehicle speed. As shown in FIG. 4, it is determined that the point described above is in the control start permission region, when the inclination is equal to or more than the predetermined value.

In step S6, it may be determined whether the point described above is in the control start permission region based on the combination the determination factors, i.e., the car-to-car distance, the estimated time duration before a crash, and the car-to-car time.

In step S7, the control circuit 130 determines whether the accelerator pedal has been released, based on a signal from the throttle opening degree sensor 114. If it is determined in step S7 that the accelerator pedal has been released, the operation proceeds to step S8. On the other hand, if the accelerator has not been released, the operation of step S7 is executed again.

In step S8, the control circuit 130 obtains the target gear to be selected by the downshift control. The target gear is set to a gear at which a target distance or a target relative vehicle speed between the preceding vehicle and the vehicle are achieved when the downshift control to the target gear is performed.

The target gear is obtained, for example, referring to the target shift map (FIG. 5) that has been stored in the ROM 133 in advance. As shown in FIG. 5, the target gear is obtained based on the car-to-car time [sec] and the relative vehicle speed [km/h] between the vehicle and the preceding vehicle. Note that, as described above, the car-to-car time is obtained by dividing the car-to-car distance by the speed of the vehicle.

As seen from FIG. 5, for example, when the relative vehicle speed is 15 [km/h] and the car-to-car time is 1.2 [sec], the target gear is fifth gear. As the relative vehicle speed or the car-to-car distance approaches a value at which a safe distance between the vehicle and the preceding vehicle is maintained, the target gear is set to a higher gear (not to decelerate the vehicle). In other words, as the distance between the vehicle and the preceding vehicle is increased, the target gear is set to a higher gear shown on the upper-right side of the target shift map in FIG. 5. On the other hand, as the distance between the vehicle and the preceding vehicle is reduced, the target gear is set to a lower gear shown on the lower-left side of the target shift map. After step S8 is completed, step S9 is executed.

In step S9, the control circuit 130 determines that whether the target gear obtained in step S8 is equal to or higher than the lowest gear. When it is determined that the target gear is equal to or higher than the lowest gear, the operation goes to step S11, otherwise to step S10.

In step S10, the control circuit 130 sets the target gear to the lowest gear. After step S10 is completed, the following step S11 is executed.

In step S11, the control circuit 130 executes the downshift control. Thus, a shift to the target gear is carried out, and the deceleration corresponding to the target gear acts on the vehicle.

According to the above-described embodiment, the following effects can be obtained. In the embodiment, the deceleration manner determining means 118 is provided for determining the manner in which the driver performs the operation for decelerating the vehicle. When the deceleration manner determining means 118 determines the manner in which the driver performs the operation for decelerating the vehicle corresponds to the last-minute deceleration-operation driver (i.e., the driver who releases the accelerator pedal or operates the foot brake at a late time; and who achieves a large deceleration by operating the foot brake in a short period, as compared with the average driver), the maximum value of deceleration (guard value: the lowest gear) that can be applied to the vehicle by the control for increasing deceleration based on the running environment parameter (in this embodiment, a relative positional relationship with the preceding vehicle) is increased to a value (to decelerate the vehicle more) that does not exceed the deceleration usually achieved by the foot brake operation performed by the driver.

Setting the maximum deceleration that can be achieved by the deceleration control in the above-mentioned manner enables the drivers, who perform the operation for decelerating the vehicle in different manners, to feel the greatest possible effects of the control, as well as preventing these drivers from depending on the control. As a result, the load on the driver is reduced, and safety is thus improved.

The last-minute deceleration-operation driver releases the accelerator pedal or operates the foot brake at a late time, as compared to the average driver. Accordingly, a target deceleration that is achieved by the deceleration control performed based on the running environment parameter is large (that is, the target gear is low), as compared to the average driver. If, the lowest gear (guard value) is uniformly set, regardless of the manner in which the driver performs the operation for decelerating the vehicle, to a low gear at which the deceleration (denoted by the reference numeral 203 in FIG. 3) that is sufficiently large even for the last-minute deceleration-operation driver is achieved, the average driver is gradually accustomed to the deceleration control, and tends to neglect operating the foot brake (as shown in FIG. 3, if the deceleration 103 is achieved by the deceleration control and applied to the vehicle driven by the average driver, the driver no longer performs the foot brake operation 104). To address this, in the embodiment, the maximum deceleration (guard value) that can be achieved by the deceleration control is set based on the manner in which the driver performs the operation for decelerating the vehicle. In addition, the maximum deceleration that can be achieved by the deceleration control is set to a value that does not exceed the deceleration usually achieved by the brake operation performed by the driver.

Note that, in the embodiment described above, in the case where it is determined that the driver prefers (see Japanese Patent Application Publication No. JP-A-2005-147309) sport-oriented driving style, a threshold value, which is used to determine in step S1 whether the manner in which the driver performs the operation for decelerating the vehicle corresponds to the last-minute deceleration-operation driver, may be changed, while the threshold value is not changed if it is determined that the driver prefers normal driving style. With such a change in the threshold value, the driver who prefers sport-oriented driving style is more unlikely to be determined to be the last-minute deceleration-operation driver than the driver who prefers the normal driving style, even if these two types of drivers perform the operation (foot brake operation) in the same manner. In the case where the threshold is not changed, when a driver who usually decelerates the vehicle in the average manner happens to operate the vehicle in the sport-oriented driving style, there is a possibility that an erroneous determination that this driver is a last-minute deceleration-operation driver may be made. In this case, the lowest gear (guard value) is changed to a lower gear. When the manner the driver operates the vehicle is returned to the normal driving style from the sport-oriented driving style, the diver tends to depend on the control and there is a possibility of neglecting the operation of the foot brake.

Figure 6:
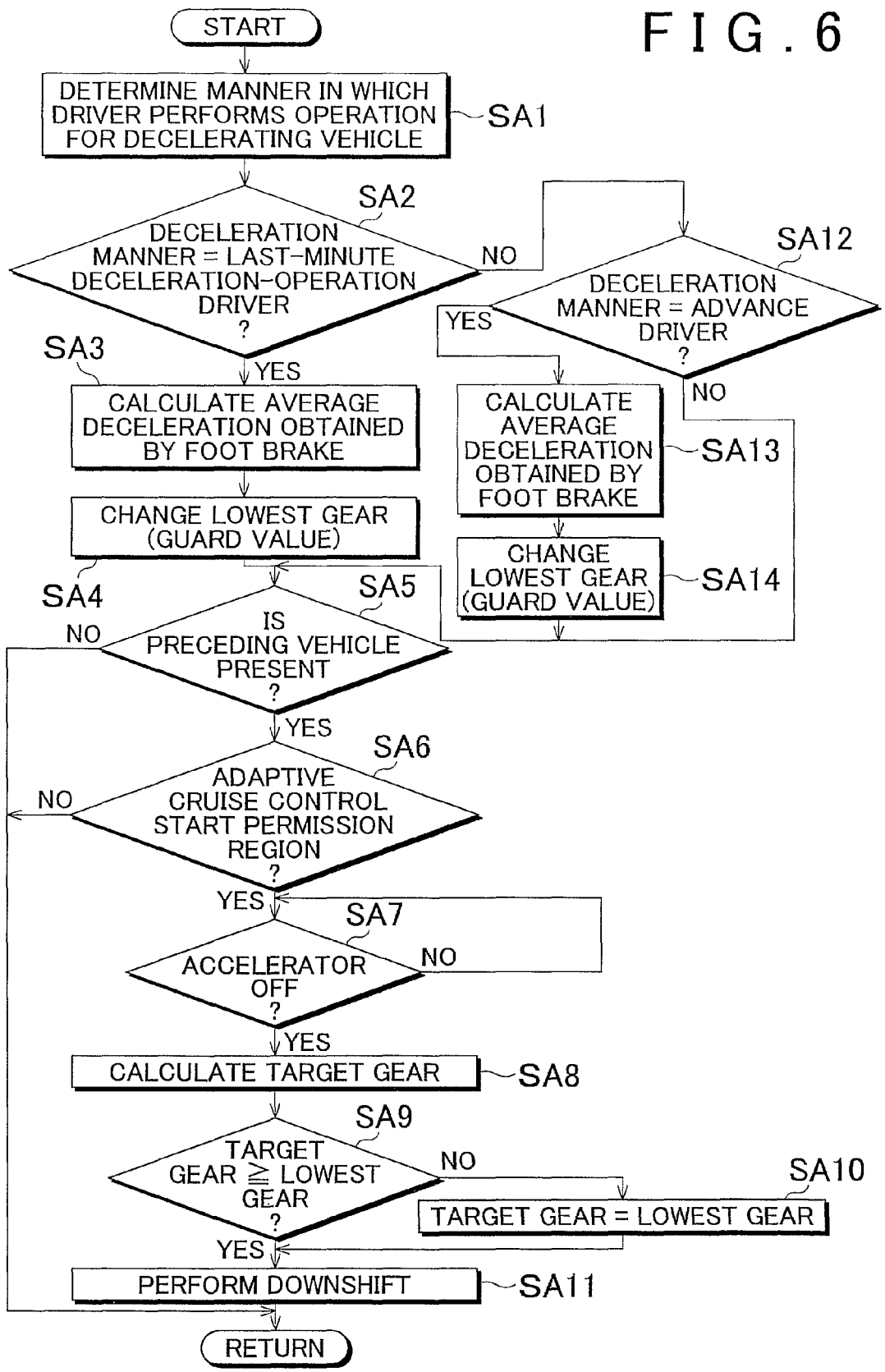
FIG. 6 is the flow chart showing the operation performed by the deceleration control apparatus for a vehicle according to a first modified example of the embodiment of the invention.

With reference to FIG. 6, a first modified example of the embodiment will be described. In the embodiment described above, when it is determined that the manner in which the driver performs the operation for decelerating the vehicle corresponds to the last-minute deceleration-operation driver rather than the predetermined average driver, the lowest gear (guard value) is changed to a lower gear at which deceleration that does not exceed the deceleration, which is usually achieved by the foot brake operation performed by the driver, is achieved.

In the first modified example, when it is determined in step SA12 that the driver releases the accelerator pedal or operates the foot brake at an early time, or achieve a required deceleration by operating the foot brake for a long time, as compared with the average driver (hereinafter, such a driver will be referred to as an "early-stage deceleration-operation driver" in this specification) ("YES" in step SA12), the lowest gear (guard value) may be changed in step SA14 to a gear which is higher than that for the average driver and at which a deceleration, which does not exceed the deceleration (calculated in step SA13) usually achieved by the foot brake operation performed by the early-stage deceleration-operation driver, is achieved. That is, in the case of the early-stage deceleration-operation driver, the maximum value of deceleration (guard value: the lowest gear) is changed to a value that does not exceed the deceleration usually achieved by the foot brake operation performed by the early-stage deceleration-operation driver.

In the embodiment described above, the manner in which the driver performs the operation for decelerating the vehicle is classified into two types, i.e., the manner corresponds to the average driver and the manner corresponds to the last-minute deceleration-operation driver. However, the manner in which the driver performs the operation for decelerating the vehicle may be classified into three or more types. For instance, the last-minute deceleration-operation driver may be further classified into a plurality of groups on the basis of the difference in the operation performed by the driver (for example, a time at which the foot brake is operated), and the lowest gear may be changed based on the group to which the driver belongs.

Next, a second modified example of the embodiment will be described. In the embodiment described above, the case where the deceleration control based on the running environment parameter is the adaptive cruise control is described. However, the deceleration control to which the invention is applied is not limited to the adaptive cruise control. The invention is also applicable to the deceleration control based on another running environment parameter, for example, the degree at which the road ahead of the vehicle is curved (e.g. the curvature or curvature radius of the curve). In the case of the corner control, whether the manner in which the driver performs the operation for decelerating the vehicle corresponds to the last-minute deceleration-operation driver may be determined based, for example, on the distance between the point at which the accelerator pedal is released or the foot brake is applied and the starting point of the curve, the time period during which the foot brake is operated, and the magnitude of deceleration achieved by the foot brake.

Next, a third modified example of the embodiment will be described. In the embodiment described above, the deceleration control based on the running environment parameter is performed by controlling the gears of the multi-speed automatic transmission 10. However, instead of this, the deceleration control may be performed by controlling the speed ratio of a continuously variable transmission.

Next, a fourth modified example of the embodiment will be described. In the embodiment described above, the deceleration control based on the running environment parameter is performed only by the shift control of the automatic transmission. However, instead of this, the deceleration control may be performed by the cooperative control of the automatic transmission and the brake. In this case, in addition to the shift control of the automatic transmission 10, the feedback control of the brake apparatus 200 is performed by the brake control circuit 230. The feedback control of the brake means that the braking force is controlled in accordance with the deviation of the deceleration actually applied to the vehicle from the target deceleration. In the fourth modified example, the maximum value of deceleration (target deceleration) that can be applied to the vehicle by the cooperative control of the automatic transmission and the brake is changed according to the manner in which the driver performs the operation for decelerating the vehicle.

The feedback control of the brake is started at the location where a downshift command is issued. More specifically, the brake braking force signal SG1 indicative of the target deceleration is output from the control circuit 130 to the brake control circuit 230 via the brake braking force signal line L1. The brake control circuit 230 generates the brake control signal SG2 based on the brake braking force signal SG1 received from the control circuit 130, and outputs the brake control signal SG2 to the hydraulic control circuit 220.

The hydraulic control circuit 220 controls hydraulic pressures to be supplied to the brake devices 208, 209, 210 and 211, based on the brake control signal SG2, thereby generating braking force as directed by the brake control signal SG2.

In the feedback control of the brake apparatus 200, the target value is the target deceleration, the controlled variable is the deceleration actually applied to the vehicle, the controlled objects are the brakes (i.e., the brake devices 208, 209, 210 and 211), the operation amount is the brake control amount, and the main disturbance is the deceleration achieved by the shift of the transmission 10. The deceleration actually applied to the vehicle is detected, for example, by the acceleration sensor 90.

In other words, the braking force (brake control amount) of the brake apparatus 200 is controlled so that the deceleration actually applied to the vehicle becomes equal to the target deceleration. That is, the brake control amount is set to a value at which the deceleration corresponding to the deviation of the deceleration, which can be achieved by the shift of the automatic transmission 10, from the target deceleration to be applied to the vehicle can be obtained.

Note that the brake control in the fourth modified example may be performed by using another brake apparatus that applies a braking force to the vehicle, such as a regenerative brake by a motor-generator arranged in a power train system.

Next, a fifth modified example of the embodiment will be described. In the embodiment described above, the lowest gear (guard value) is changed in step S4. However, in the fifth modified example, a gear determination map itself may be changed. More specifically, in this case, a gear determination map which reflects the guard value may be used. For example, when the guard value is fourth gear, a map that is obtained by changing the values in the map of FIG. 5, which shows the gears equal to or lower than third gear, to fourth gear may be used. Thus, the map reflecting the guard value that has been changed in advance according to the manner in which the driver performs the operation for decelerating the vehicle may be selected based on the manner of deceleration.

Although the deceleration showing the amount of deceleration to be applied to the vehicle is explained by using the deceleration (G) in the above description, the control may be performed based on deceleration torque.

The invention claimed is:

1. A deceleration control apparatus for a vehicle that applies a deceleration to the vehicle based on a vehicle running environment parameter, comprising:
 a determining device that determines a manner in which a driver performs an operation for decelerating the vehicle based on a comparison of a detected value and a predetermined value where the detected value is determined based on 1) a detected distance between the vehicle and a preceding vehicle and 2) a present speed of the vehicle;
 a setting device that sets a deceleration, that is smaller than a deceleration usually achieved by a brake operation performed by a driver, as a guard value to be applied to the vehicle by the deceleration control apparatus; and
 a changing device that changes the deceleration that is set as a guard value based on the manner in which the driver performs the operation for decelerating the vehicle where the guard value is changed when the detected value differs from the predetermined value,
 wherein the deceleration control apparatus applies the deceleration by performing a downshift control and the guard value is a highest gear ratio that can be selected during the downshift control.

2. The deceleration control apparatus according to claim 1, wherein a time at which the driver performs the operation for decelerating the vehicle is relatively late when the detected value is less than the predetermined value, such that a time period during which the brake is operated is relatively short, and the deceleration achieved by the operation of the brake is relatively large, and
 wherein the deceleration that is set as a guard value when the detected value is less than the predetermined value is changed to a value larger than a deceleration that is set as a guard value when the detected value corresponds to the predetermined value.

3. The deceleration control apparatus according to claim 1, wherein a time at which the driver performs the operation for decelerating the vehicle is relatively early when the detected value is more than the predetermined value, such that a time period during which the brake is operated is relatively long, and the deceleration achieved by the operation of the brake is relatively small, and
 wherein the deceleration that is set as a guard value when the detected value is more than the predetermined value is changed to a value smaller than a deceleration that is set as a guard value when the detected value corresponds to the predetermined value.

4. The deceleration control apparatus according to claim 1, wherein
 the deceleration that is set as a guard value is set to a value that is smaller than a deceleration that is achieved by an operation performed by an average driver.

5. The deceleration control apparatus according to claim 4, further comprising:
 a detecting device that detects a deceleration that was achieved by an operation performed by the driver in the past, wherein
 the deceleration that is achieved by the operation performed by the average driver is set based on the deceleration detected by the detecting device.

6. A deceleration control apparatus for a vehicle that applies a deceleration to the vehicle based on a vehicle running environment parameter, comprising:
 a detecting device that detects a deceleration that was achieved by the operation performed by a driver in the past based on a comparison of previously detected values and a predetermined value where the previously detected values are determined based on 1) respective detected distances between the vehicle and a preceding vehicle and 2) a respective speed of the vehicle at the time the respective detected distances were detected,
 wherein a deceleration that is achieved by the operation performed by an average driver is set based on the deceleration detected by the detecting device,
 wherein the deceleration control apparatus sets a deceleration that is smaller than the deceleration achieved by a brake operation performed by the average driver, as a guard value to be applied to the vehicle by the deceleration control apparatus.

7. A deceleration control method for a vehicle that applies a deceleration to the vehicle based on a vehicle running environment parameter, comprising:
 determining a manner in which a driver performs an operation for decelerating the vehicle based on a comparison of a detected value and a predetermined value where the detected value is determined based on 1) a detected distance between the vehicle and a preceding vehicle and 2) a present speed of the vehicle;
 setting a deceleration, that is smaller than a deceleration usually achieved by a brake operation performed by a driver, as a guard value to be applied to the vehicle by the deceleration control method; and
 changing the deceleration that is set as a guard value based on the manner in which the driver performs the operation for decelerating the vehicle when the detected value differs from the predetermined value,
 wherein the deceleration is performed by a downshift control and the guard value is a highest gear ratio that can be selected during the downshift control.

8. The deceleration control method according to claim 7, wherein a time at which the driver performs the operation for decelerating the vehicle is relatively late when the detected value is less than the predetermined value, such that a time period during which the brake is operated is relatively short, and the deceleration achieved by the operation of the brake is relatively large, and
 wherein the method includes changing the deceleration that is set as a guard value when the detected value is less than the predetermined value to a value larger than a deceleration that is set as a guard value when the detected value corresponds to the predetermined value.

9. The deceleration control method according to claim 7, wherein a time at which the driver performs the operation for decelerating the vehicle is relatively early when the detected value is more than the predetermined value, such that a time period during which the brake is operated is relatively long, and the deceleration achieved by the operation of the brake is relatively small, and
 wherein the method includes changing the deceleration that is set as a guard value when the detected value is more than the predetermined value to a value smaller than a deceleration that is set as a guard value when the detected value corresponds to the predetermined value.

10. The deceleration control method according to claim 7, wherein
the deceleration that is set as a guard value is set to a value that is smaller than a deceleration that is achieved by an operation performed by an average driver.

11. The deceleration control method according to claim 10, further comprising:
detecting a deceleration that was achieved by the operation performed by the driver in the past; and
setting the deceleration that is achieved by the operation performed by the average driver based on the detected deceleration.

12. A deceleration control method for a vehicle that applies a deceleration to the vehicle based on a vehicle running environment parameter, comprising:
detecting a deceleration that was achieved by the operation of the driver in the past based on a comparison of previously detected values and a predetermined value where the previously detected values are determined based on 1) respective detected distances between the vehicle and a preceding vehicle and 2) a respective speed of the vehicle at the time the respective detected distances were detected;
setting a deceleration that is smaller than a deceleration achieved by a brake operation performed by an average driver, as a guard value to be applied to the vehicle by the deceleration control method,
wherein the setting the deceleration that is achieved by the operation performed by the average driver based on the detected deceleration.

13. The deceleration control apparatus according to claim 1,
wherein the deceleration control apparatus determines, based on a relationship between the vehicle and the preceding vehicle, that the vehicle is in a region where the downshift control is permissible,
wherein the deceleration control apparatus determines whether an accelerator pedal is released, and
wherein the downshift control is performed once the deceleration control apparatus determines that the vehicle is in the region where the downshift control is permissible and the accelerator pedal is released.

14. The deceleration control apparatus according to claim 13,
wherein the downshift control includes a determination of a target gear based on the relationship between the vehicle and the preceding vehicle, and
wherein if the determined target gear is lower than the guard value then the target gear is set equal to the guard value.

15. The deceleration control method according to claim 7, further comprising:
determining whether the vehicle is in a region where the downshift control is permissible based on a relationship between the vehicle and the preceding vehicle; and
determining whether an accelerator pedal is released,
wherein the downshift control is performed once it is determined that the vehicle is in the region where the downshift control is permissible and the accelerator pedal is released.

16. The deceleration control method according to claim 15,
wherein the downshift control includes a determination of a target gear based on the relationship between the vehicle and the preceding vehicle, and
wherein if the determined target gear is lower than the guard value then the target gear is set equal to the guard value.

* * * * *